United States Patent
Zernickel et al.

(10) Patent No.: US 7,147,375 B2
(45) Date of Patent: Dec. 12, 2006

(54) LINEAR GUIDE

(75) Inventors: Alexander Zernickel, Herzogenaurach (DE); Horst Döppling, Herzogenaurach (DE)

(73) Assignee: INA-Schaeffler KG, Herzogenaurach (DE)

(*) Notice: Subject to any disclaimer, the term of this patent is extended or adjusted under 35 U.S.C. 154(b) by 0 days.

(21) Appl. No.: 11/225,984

(22) Filed: Sep. 14, 2005

(65) Prior Publication Data

US 2006/0005659 A1  Jan. 12, 2006

Related U.S. Application Data

(60) Division of application No. 10/643,209, filed on Aug. 15, 2003, now Pat. No. 6,948,401, which is a continuation of application No. PCT/EP02/00675, filed on Jan. 24, 2002.

(30) Foreign Application Priority Data

Feb. 15, 2001 (DE) .............................. 101 06 982

(51) Int. Cl.
  *F16C 29/04* (2006.01)
  *F16D 3/06* (2006.01)
(52) U.S. Cl. ..................... 384/49; 74/493; 384/54; 384/55; 464/167
(58) Field of Classification Search ............... 74/492, 74/493; 384/48, 49, 50, 54, 55, 56, 57; 403/283; 464/167; 29/517
See application file for complete search history.

(56) References Cited

U.S. PATENT DOCUMENTS

| 1,291,388 | A | * | 1/1919 | Bright et al. | ............... | 403/266 |
| 1,775,055 | A | * | 9/1930 | Tarbox et al. | ................ | 29/517 |
| 2,023,796 | A | | 12/1935 | Sorensen et al. | | |
| 3,169,407 | A | | 2/1965 | Newell et al. | | |
| 3,427,656 | A | | 2/1969 | Miller | | |
| 4,280,341 | A | | 7/1981 | Krude | | |
| 5,620,259 | A | | 4/1997 | Mainardi | | |
| 5,772,517 | A | | 6/1998 | Guimbretiere | | |
| 6,174,239 | B1 | | 1/2001 | Guimbretiere | | |
| 6,474,868 | B1 | | 11/2002 | Geyer et al. | | |

FOREIGN PATENT DOCUMENTS

| DE | 6 49 218 C | 8/1937 |
| DE | 22 37 408 A | 8/1973 |
| DE | 27 05 331 A | 8/1978 |
| DE | 31 24 927 A1 | 3/1983 |
| DE | 37 30 393 A1 | 3/1989 |
| DE | 89 06 246 U1 | 3/1990 |
| DE | 38 34 900 | 4/1990 |
| DE | 196 19 449 A1 | 12/1996 |

(Continued)

*Primary Examiner*—William C. Joyce
(74) *Attorney, Agent, or Firm*—Henry M. Feiereisen

(57) ABSTRACT

A linear guide for transmitting a torque between a tubular housing, which is defined by a longitudinal axis and rotatable about the longitudinal axis, and a shaft, which is received in the housing and movable in the direction of the axis in relation to the housing, includes a bearing assembly received in the housing for support of the shaft and attached to the housing by swaging a housing portion. The bearing assembly has two bearing members and a set of rolling bodies disposed between the bearing members. One bearing member is constructed as bushing which is retained in the housing and defines a center axis which is oriented out-of-alignment with a normal upon a longitudinal shaft axis, and the other bearing member has a cup-shaped configuration to define a convex surface for support by a surface area of the shaft.

14 Claims, 2 Drawing Sheets

FOREIGN PATENT DOCUMENTS

| | | |
|---|---|---|
| DE | 196 21 464 A | 12/1997 |
| EP | 02 81 723 A2 | 9/1988 |
| FR | 26 29 156 A1 | 9/1989 |

* cited by examiner

LINEAR GUIDE

CROSS-REFERENCES TO RELATED APPLICATIONS

This application is a division of prior filed copending U.S. application Ser. No. 10/643,209, filed Aug. 15, 2003 which is a continuation of prior filed copending PCT International application no. PCT/EP02/00675, filed Jan. 24, 2002, which designated the United States and on which priority is claimed under 35 U.S.C. §120 and which claims the priority of German Patent Application, Serial No. 101 06 982.0, filed Feb. 15, 2001, pursuant to 35 U.S.C. 119(a)–(d).

BACKGROUND OF THE INVENTION

The present invention relates to a linear guide for transmitting a torque between a tubular housing, which is defined by a longitudinal axis and rotatable about the longitudinal axis, and a shaft, which is received in the housing and movable in the direction of the axis in relation to the housing.

Linear guides for transmission of torques are used in the automobile industry for example for guiding racks or for guiding steering spindles in a steering column. Another use involves the guidance of gearshift shafts or gearshift rails in the transmission of motor vehicles.

U.S. Pat. No. 3,427,656 describes a linear guide having sets of axial rolling bearings which are arranged in the area of a radial plane of a shaft and are held in a tubular housing. The axial rolling bearings surround the shaft and have cup-shaped running disks for support on the shaft surface. As the shaft has a circular cross section, torque of the shaft cannot be transmitted to the housing. This conventional linear guide requires also the arrangement of a tensioning screw to pretension the sets of axial rolling bearings and to act in the area of a radial slot of the housing upon the housing.

German patent publication No. DE 196 19 449 A1 describes a linear guide having a rod or shaft with rollers bearing on the bearing surface of the shaft and which are rotatably supported in a carriage surrounding the shaft. The carriage is configured as a rectangular hollow profile with T-grooves that are exteriorly accessible, and by means of which other desired parts may be secured. For support of the rollers, bore holes are provided at the side walls of the hollow profile where rotational bearing, in particular roller bearings are disposed. Furthermore, at least one roller, respectively the bearing support of the roller requires a control device, preferably a set screw for snug adjustment of the roller against the shaft.

German patent publication no. DE 37 30 393 A1 discloses a torque transmitting connection for shaft parts that move axially within one another for use in a steering shaft of a motor vehicle. The linear guide has balls as rolling members which are received free from play in inner longitudinal grooves of the outer shaft part, on one hand, and in outer longitudinal grooves of the inner shaft part, on the other hand. In order to compensate manufacturing tolerances and to realize a smooth running without a need for refinishing works, when the shaft parts move axially relative to one another, the balls must be arranged in raceways of sheet metal which are placed in the longitudinal grooves and loaded radially under tension in relation to the longitudinal center axis of the shaft. Moreover, both shaft parts can be moved axially relative to one another only in a limited manner.

It would therefore be desirable and advantageous to provide an improved linear guide which obviates prior art shortcomings and which is simple in structure and cost-efficient while still being reliable in operation independent on dimensional tolerances of the tubular housing and the axially movable shaft.

SUMMARY OF THE INVENTION

According to one aspect of the present invention, a linear guide for transmitting a torque between a tubular housing, which is rotatable about a longitudinal axis, and a shaft, which is received in the housing and movable in the direction of the axis in relation to the housing, includes plural axial rolling bearings received in the housing in surrounding relationship to the shaft, wherein the plural axial rolling bearings are disposed in two radial planes in axial spaced-apart relationship, wherein the axial rolling bearings in each of the two radial planes have each two bearing members and a set of rolling bodies disposed between the bearing members, wherein one bearing member is constructed as bushing which is retained in the housing and defines a center axis which is shifted in parallel relationship at an offset to a normal of a longitudinal shaft axis, wherein the other bearing member has a cup-shaped configuration to define a convex surface for support by a surface area of the shaft.

As a consequence of the parallel shift of the bushing axis in relation to the shaft center, and in view of the convex cup-shaped surface of the bearing member and its support on the surface area of the shaft, the contact point of the shaft is shifted so as to establish a rotation lever which causes a rotation of the bearing member, when the shaft moves linearly. An adverse impact of dimensional tolerances can be eliminated by a tolerance-independent positioning of the axial rolling bearing in relation to the shaft.

According to another aspect of the present invention, a linear guide for transmitting a torque between a tubular housing, which is rotatable about a longitudinal axis, and a shaft, which is received in the housing and movable in the direction of the axis in relation to the housing, includes plural radial needle bearings received in the housing in surrounding relationship to the shaft, wherein the plural axial rolling bearings are disposed in two radial planes in axial spaced-apart relationship, wherein the radial needle bearings in each of the two radial planes have each two bearing members and a set of rolling bodies disposed between the bearing members, wherein one bearing member is constructed as needle bushing which is retained in the housing and defines a center axis which is shifted to a normal of a longitudinal shaft axis, wherein the other bearing member has a cup-shaped configuration to define a convex surface for support by a surface area of the shaft, and includes bearing journal which is surrounded by the needle bushing, with the rolling bodies arranged in the needle bushing and constructed as needles.

Hereby, the center axis of the needle bushing may be shifted in parallel relationship to the normal at an offset, or, as an alternative, the center axis of the needle bushing may be inclined at an angle in relation to the normal to have a same effect.

A linear guide In accordance with the present invention is thus able to transmit torques but also to transmit tilting moments. When defining the longitudinal shaft axis as X-axis and the two axes which extend perpendicular to the X-axis and perpendicular to one another as Y-axis and Z-axis, moments about the X-axis are torques which are transmitted from the shaft onto the housing. As the bearings, which surround the shaft, are disposed in two radial planes in axial spaced-apart relationship, moments about the Y-axis and moments about the Z-axis, which are tilting moments, can be further be transmitted from the shaft onto the housing.

As the housing is thin-walled, when used as steering tube, its elasticity can be exploited as pretensioning element. In this case, the respective support bearings are mounted initially in the housing with overmeasure in relation to the center. As the shaft is then inserted into the housing, the housing is widened, i.e. the steering tube undergoes an elastic deformation, to realize the intended pretensioning effect. The need for a special tensioning screw, as required in the prior art, is thus no longer necessary.

The shaft of the linear guide may be a steering column spindle of polygonal configuration, e.g. of triangular, tetragonal, or square cross section, wherein the surface area has a concave shape, and wherein at least two longitudinal sides adjoining one another in circumferential direction have each a concave surface area. As a consequence of the concave surface areas, the load-carrying capability of the bearing is enhanced.

The invention allows the use of complete bearing kits with rolling bodies and raceways, so that it is no longer necessary to incorporate the raceways the housing.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
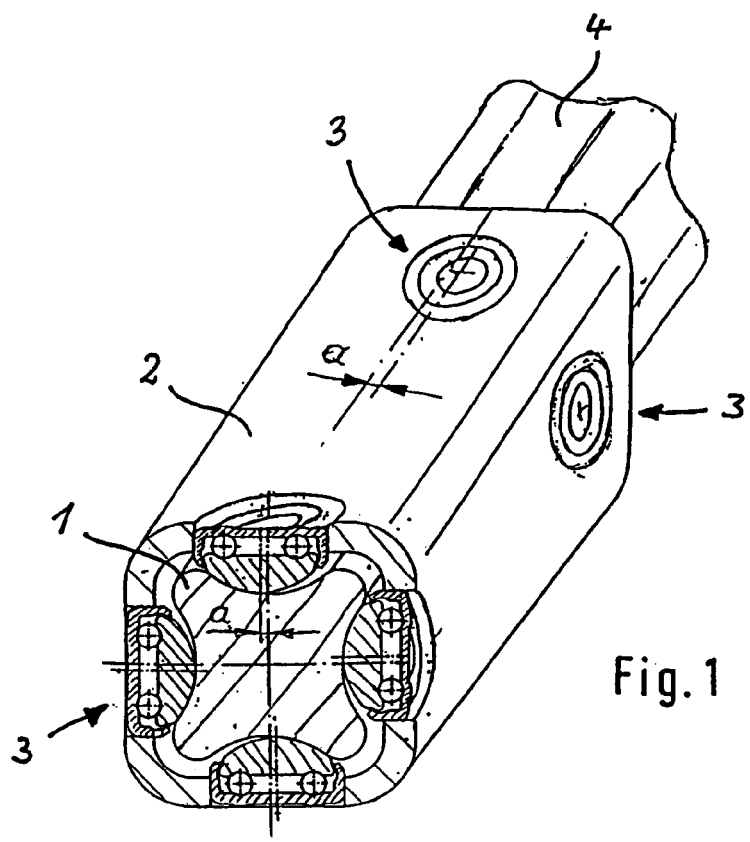
FIG. 1 is a perspective illustration of one embodiment of a linear guide according to the present invention, illustrating a cross section in an area of a bearing plane to show axial rolling bearings incorporated therein.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a linear guide according to the present invention, including a shaft 1, a housing 2, and a plurality of axial rolling bearings, generally designated by reference numeral 3 and constructed as ball bearings. The shaft 1 has a generally square cross section with four longitudinal sides, wherein each longitudinal side is formed with a concave surface area 4 which extends with constant cross sectional dimensions in longitudinal direction of the shaft 1. The linear guide according to the present invention may be suitable as steering shaft or steering column for a motor vehicle, whereby the tubular housing 2 may be suitable as steering tube and the shaft 1, which is axially movable in the housing 2, may be constructed as steering spindle.

The housing 2 is configured in the form of a square tube and has inner cross sectional dimensions which are greater than the shaft size. The shaft 1 is inserted axially into the housing 2 and supported by the axial rolling bearings 3. The linear guide has hereby two radial bearing planes which are disposed in axial spaced-apart relationship. In the area of each bearing plane, there are disposed four axial rolling bearing 3 about the periphery of the tubular housing 2. The housing 2 is formed hereby with radial bores 5 which extend continuously from one end to the other end of the housing 2, wherein each bore 5 is placed in neighboring relationship to the a concave surface area 4 of the shaft 1.

Each axial rolling bearing 3 includes a bearing member in the form of a running ring or running disk 6, a C-shaped bushing 7, and a set of rolling bodies 8 which are arranged between the running disk 6 and the bushing 7 and designed as balls. The disk 6 has a cup-shaped configuration and has a convex cup-shaped surface 9 in confronting relationship to the shaft 1 for support in the adjacent concave surface area 4 of the shaft 1. Suitable osculation conditions result in a point contact 10 between the disk 6 and the shaft 1.

Figure 2:
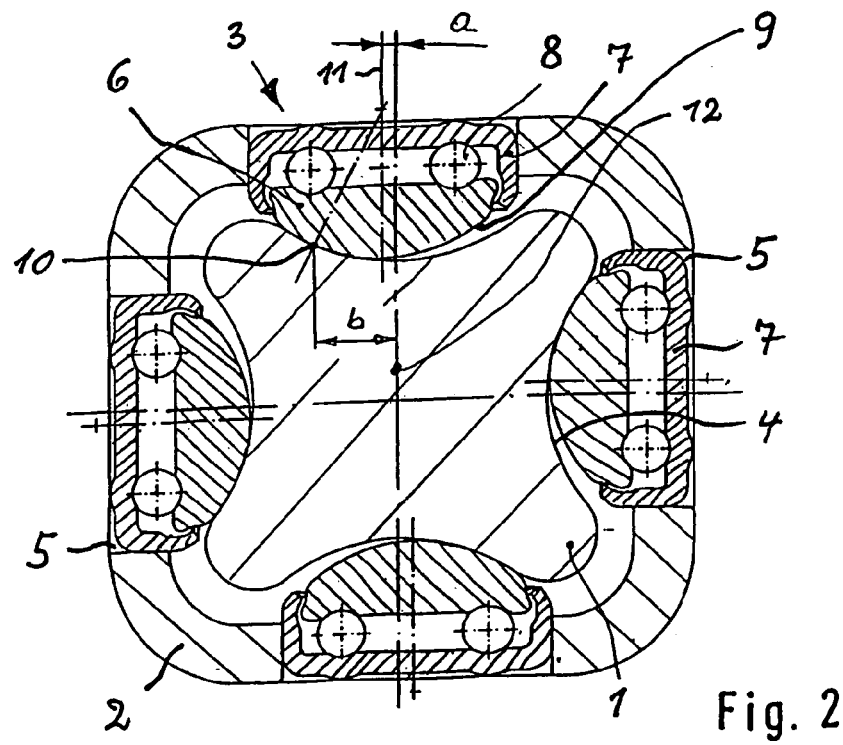
FIG. 2 is a cross sectional view, on an enlarged scale, of the linear guide of FIG. 1.

The cup-shaped running disk 6 is supported via the orbiting set of rollers 8 on the bushing 7, which is a shaped component made through a process without material removal and includes a raceway for the set of rolling bodies 8. The bushing 7 is press-fitted in the respective bore 5 of the housing 2, whereby the bore 5 is so arranged in the housing 2 that the center axis 11 of the bushing 7 is shifted at an offset "a" (FIG. 2) in parallel relationship to a normal 12 oriented in the bearing plane upon the longitudinal axis of the shaft 1. As a consequence of this offset, the contact point 10 is shifted by the distance "b" relative to the normal 12 to thereby form a rotation lever. Thus, as the shaft 1 moves linearly within the housing 2, this rotation lever causes a rotation of the running disk 6 about the contact point or realized contact line 10.

The axial rolling bearings 3 can be properly positioned, regardless of tolerances, relative to the shaft during installation in the tubular housing 2 as follows: The axial rolling bearings 3 are press-fitted in the bores 5 deep enough to establish a desired contact upon the shaft 1. A proper positioning can be determined by the degree of the force increase.

FIG. 1 shows a cross section in the forward bearing plane. In order to properly position the shaft 1 in the housing 2, at least one further bearing plane is required in axial spaced-apart relationship so as to realize a play-free torque transmission in both circumferential directions of the linear guide. FIG. 1 shows in an area of a rearward bearing plane the arrangement of two bushings of pertaining axial rolling bearings 3. The shaft 1 can be positioned in all axis directions in such a square profile by providing at least two axial rolling bearings 3 for each bearing plane.

Of course, the shaft 1 may have a configuration different from the square profile as shown in the drawing. For example, the shaft 1 may have a triangular profile, a polygonal profile, a hollow profile, or a solid profile. Also the provision of a round shaft may be conceivable, although torque cannot be transmitted.

Figure 3:
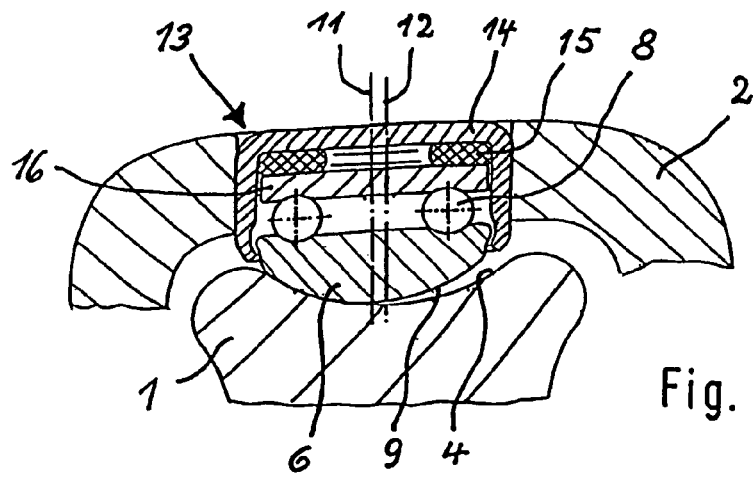
FIG. 3 is a fragmentary cross sectional view of a variation of a linear guide according to the present invention with modified axial rolling bearing.

FIG. 3 shows a fragmentary cross sectional view of a variation of a linear guide according to the present invention. The description below will center on the differences between the embodiments. In the embodiment of FIG. 3, provision is made for an axial rolling bearing, designated by reference numeral 13 and having a bushing 14 and a resilient rubber ring 15 which is received in the bushing 14. Supported on the rubber ring 15 is a bearing disk 16 to form a raceway for the set of rolling bodies 8. The rubber ring 15 operates hereby as an element to compensate for dimensional tolerance and to absorb noise.

Figure 4:
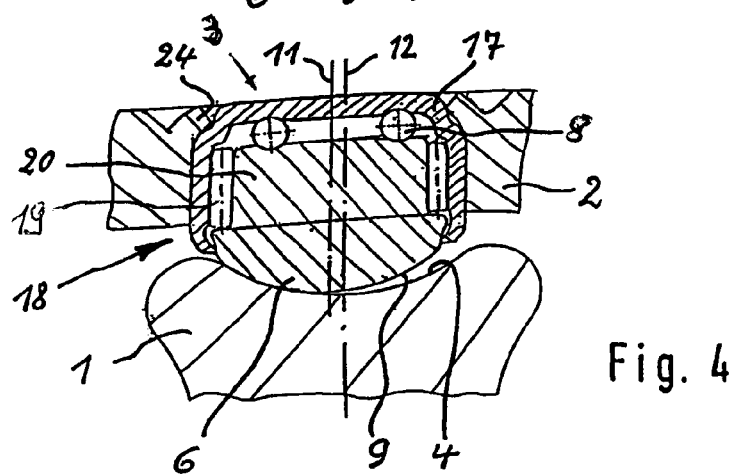
FIG. 4 is a fragmentary cross sectional view of still another variation of a linear guide according to the present invention with a rolling-contact bearing including of needles and balls.

FIG. 4 shows a fragmentary cross sectional view of still another variation of a linear guide according to the present invention. The description below will center on the differences between the embodiments. In the embodiment of FIG. 4, the linear guide is constructed here, instead of a pure axial rolling bearing, with a rolling-contact bearing assembly that combines an axial rolling bearing with a set of rolling bodies 8 and a radial needle bearing 18 with needles 19. The radial needle bearing 18 is provided with a needle bushing 17 and a set of rolling bodies in the form of the needles 19 for support of a bearing journal 20 during linear movement in relation to the housing 2. The bearing journal 20 forms part of T-shaped bearing member and is secured to the running disk 6 or formed in one piece therewith, whereby the needles 19 are disposed radially between the bearing journal 20 and the needle bushing 17. The set of rolling bodies 8 of the axial rolling bearing is disposed axially between the bottom of the needle bushing 17 and an outer end surface of the bearing journal 20 and provided for axial support of the bearing journal 20 as well as reducing friction during rotation of the bearing journal 20.

Figure 5:
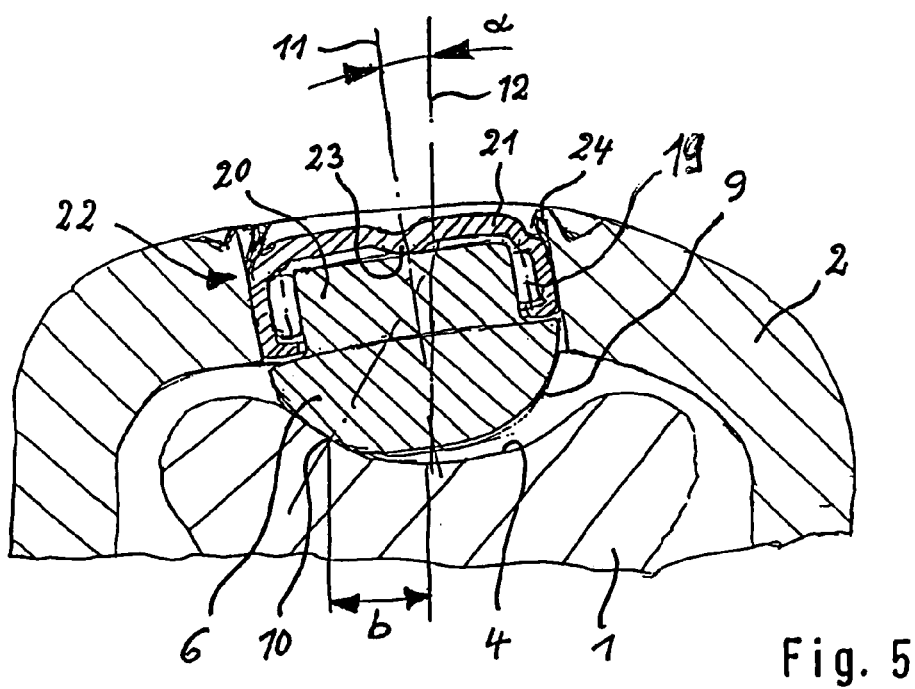
FIG. 5 is a fragmentary cross sectional view of yet another variation of a linear guide according to the present invention.

FIG. 5 shows a fragmentary cross sectional view of yet another variation of a linear guide according to the present invention. The description below will center on the differences between the embodiments. In this embodiment, provision is made for radial needle bearing, designated by reference numeral 22. The needle bearing has a set of rolling bodies in the form of needles and a needle bushing 21 which is constructed in surrounding relationship to the bearing journal 20 and the needles. The needle bushing 21 has a bottom which is formed with in an inward convexly arched elevation 23 for axial support of the bearing journal 20. In this way, friction is reduced, as the bearing journal 20 rotates.

The needle bushing 21 defines hereby a center axis 11 which extends at an inclination at an angle α to the normal 12 upon the longitudinal axis of the shaft 1, thereby establishing also a rotation lever, as a consequence of the distance b between the normal 12 and the contact point 10, for the running disk 6 to realize a rotation of the bearing disk 6 about the contact point 10 during linear movement of the shaft 1.

In all embodiments each of the respective bearing may be attached to the housing 2 by means of a swaging 24 (FIGS. 4 and 5) of the housing material or by means of a split resilient ring disposed in bore 5 of housing 2. As shown in FIGS. 4 and 5, the swaging 24 is realized by shaping the housing 2 adjacent to the bore 5 to have a tapered configuration to reduce the diameter of the bore 5. Thus, once the axial rolling bearing 13 is positioned in the bore 5, the bushing 14 is prevented from migrating radially outwards by the presence of the swaged area 24.

To realize a pretension of the linear guide, it is conceivable to press one or more bearings further than the shaft size would require, for example, after insertion of a tool with dimensions that are smaller than the shaft. After extraction of the tool, the shaft is inserted in the housing which then acts as pretensioning element.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A linear guide for transmitting a torque between a tubular housing, which is defined by a longitudinal axis and rotatable about the longitudinal axis, and a shaft, which is received in the housing and movable in the direction of the axis in relation to the housing, said linear guide comprising a bearing assembly received in the housing for support of the shaft and having two bearing members and a set of rolling bodies disposed between the bearing members, with one bearing member constructed as bushing which is retained in the housing and defines a center axis which is oriented out-of-alignment with respect to a normal upon a longitudinal shaft axis, and with the other bearing member having a cup-shaped configuration to define a convex surface for support by a surface area of the shaft, wherein the bearing assembly is attached to the housing by a swaged area of a housing portion, wherein the bushing of the bearing assembly is press-fitted in a continuous radial bore of the housing, said housing portion being positioned adjacent to the bore and tapered inwards to form the swaging.

2. The linear guide of claim 1, wherein the bearing assembly includes an axial ball bearing.

3. The linear guide of claim 1, wherein the bearing assembly includes a radial needle bearing.

4. The linear guide of claim 3, wherein the other bearing member has a bearing journal, said bushing being a needle bushing having a bottom formed with an inwardly directed convexly arched elevation for support of an outer end surface of the bearing journal.

5. The linear guide of claim 1, wherein the center axis of the bushing is shifted in parallel relationship at an offset to the normal upon the longitudinal shaft axis.

6. The linear guide of claim 1, wherein the center axis of the bushing extends at an angle in relation to the normal.

7. The linear guide of claim 1, wherein the shaft is a steering-column spindle having a polygonal configuration, with the surface area having a concave shape, wherein at least two longitudinal sides adjoining one another in circumferential direction have each a concave surface area.

8. The linear guide of claim 7, wherein the polygonal configuration is selected from the group consisting of triangular configuration, tetragonal configuration, and square configuration.

9. The linear guide of claim 1, wherein the shaft is hollow.

10. The linear guide of claim 1, wherein the housing is thin-walled and forms a pretensioning element to bias the bearing assembly, when the shaft is received in the housing.

11. A linear guide for transmitting a torque between a tubular housing, which is defined by a longitudinal axis and rotatable about the longitudinal axis, and a shaft, which is received in the housing and movable in the direction of the axis in relation to the housing, said linear guide comprising:
- a bearing assembly received in the housing for support of the shaft and having two bearing members and a set of rolling bodies disposed between the bearing members, with one bearing member constructed as bushing which is retained in the housing and defines a center axis which is oriented out-of-alignment with respect to a normal upon a longitudinal shaft axis, and with the other bearing member having a cup-shaped configuration to define a convex surface for support by a surface area of the shaft, wherein the bearing assembly is attached to the housing by a swaged area of a housing portion, wherein the bearing assembly includes a radial needle bearing; and
- an axial rolling bearing having a set of rolling bodies disposed between a bottom of the bushing of the radial needle bearing and an outer end surface of the other bearing member.

12. The linear guide of claim 11, wherein the other bearing member has a T-shaped configuration with a bearing journal and a running disk, which is disposed immediately adjacent the shaft and has the convex surface, said rolling bodies of the axial ball bearing and the rolling bodies of the radial needle bearing being positioned between the one bearing member and the bearing journal.

13. A linear guide for transmitting a torque between a tubular housing, which is defined by a longitudinal axis and rotatable about the longitudinal axis, and a shaft, which is received in the housing and movable in the direction of the axis in relation to the housing, said linear guide comprising plural axial rolling bearings received in the housing in surrounding relationship to the shaft, wherein the plural axial rolling bearings are disposed in two radial planes in axial spaced-apart relationship, wherein the axial rolling bearings in each of the two radial planes have each two bearing members and a set of rolling bodies disposed between the bearing members, with one bearing member constructed as bushing which is retained in the housing and defines a center axis which is shifted in parallel relationship at an offset to a normal upon a longitudinal shaft axis, and with the other bearing member having a cup-shaped configuration to define a convex surface for support by a surface area of the shaft, wherein the axial roller bearings are each attached to the housing by swaging a housing portion, wherein the bushing of the one bearing member is press-fitted in a continuous radial bore of the housing, said housing portion being positioned adjacent to the bore and tapered inwards to form the swaging.

14. A linear guide for transmitting a torque between a tubular housing, which is defined by a longitudinal axis and rotatable about the longitudinal axis, and a shaft, which is received in the housing and movable in the direction of the axis in relation to the housing, said linear guide comprising plural radial needle bearings received in the housing in surrounding relationship to the shaft, said plural radial needle bearings being disposed in two radial planes in axial spaced-apart relationship, wherein the radial needle bearings in each of the two radial planes have each two bearing members and a set of rolling bodies disposed between the bearing members, wherein one bearing member is constructed as needle bushing which is retained in the housing and defines a center axis which is shifted to a normal of a longitudinal shaft axis, wherein the other bearing member has a cup-shaped configuration to define a convex surface for support by a surface area of the shaft, and includes a bearing journal which is surrounded by the needle bushing, with the rolling bodies arranged in the needle bushing and constructed as needles, wherein the radial needle bearings are each attached to the housing by swaging a housing portion, wherein the needle bushing of the one bearing member is press-fitted in a continuous radial bore of the housing, said housing portion being positioned adjacent to the bore and tapered inwards to form the swaging.

* * * * *